(12) United States Patent
Barna et al.

(10) Patent No.: US 9,883,567 B2
(45) Date of Patent: Jan. 30, 2018

(54) DEVICE INDICATION AND COMMISSIONING FOR A LIGHTING CONTROL SYSTEM

(71) Applicant: RAB Lighting Inc., Northvale, NJ (US)

(72) Inventors: Ross A Barna, Northvale, NJ (US); Michael Theodore Case-Hayes, Northvale, NJ (US)

(73) Assignee: RAB Lighting Inc., Nrothvale, NJ (US)

( * ) Notice: Subject to any disclaimer, the term of this patent is extended or adjusted under 35 U.S.C. 154(b) by 0 days.

(21) Appl. No.: 14/823,560

(22) Filed: Aug. 11, 2015

(65) Prior Publication Data

US 2017/0111979 A1    Apr. 20, 2017

Related U.S. Application Data

(60) Provisional application No. 62/035,558, filed on Aug. 11, 2014.

(51) Int. Cl.
*H05B 37/00* (2006.01)
*H05B 39/00* (2006.01)
(Continued)

(52) U.S. Cl.
CPC .......... *H05B 37/0272* (2013.01); *H04L 67/10* (2013.01); *H04W 84/18* (2013.01);
(Continued)

(58) Field of Classification Search
None
See application file for complete search history.

(56) References Cited

U.S. PATENT DOCUMENTS

| 322,609 A | 12/1991 | Patton |
| 5,283,905 A | 2/1994 | Saadeh |

(Continued)

FOREIGN PATENT DOCUMENTS

| CA | 2236569 | 2/2006 |
| CA | 2249423 | 9/2010 |

(Continued)

OTHER PUBLICATIONS

"Altor Power for Electronics", Altor, Inc., brochure cover page, Natick, MA, circa 1997.

(Continued)

*Primary Examiner* — Anh Tran
(74) *Attorney, Agent, or Firm* — SmithAmundsen LLC; Dennis S. Schell; Kevin C. Oschman (57) ABSTRACT

A wireless device control system includes a remote server connected to a wide area network and having control software for configuring, monitoring, and controlling devices at a site. The wireless device control system also includes a wireless gateway located at the site and configured to communicate with the remote server via cellular communication. Control devices are in wireless communication with the wireless gateway via a mesh network, with each of the control devices being wired to control one of the site devices. A computer device is connected to the wide area network and has an interface enabling a user to access the server control software. Control instructions entered on the remote server through the interface are communicated from the remote server to the wireless gateway and then from the wireless gateway to the control devices.

18 Claims, 7 Drawing Sheets

(51) Int. Cl.
*H05B 41/00* (2006.01)
*H05B 37/02* (2006.01)
*H04L 29/08* (2006.01)
*H04W 84/18* (2009.01)
*H04W 88/16* (2009.01)
*H04L 12/28* (2006.01)
*H04W 12/06* (2009.01)

(52) U.S. Cl.
CPC ......... *H04W 88/16* (2013.01); *H04L 12/2803* (2013.01); *H04W 12/06* (2013.01)

(56) References Cited

U.S. PATENT DOCUMENTS

| | | |
|---|---|---|
| 5,357,361 A | 10/1994 | Nishizawa |
| 5,598,042 A | 1/1997 | Mix et al. |
| 5,623,172 A | 4/1997 | Zaretsky |
| 5,786,644 A | 7/1998 | Zaretsky |
| 5,905,442 A | 5/1999 | Mosebrook et al. |
| 5,909,429 A | 6/1999 | Satyanarayana et al. |
| 5,949,200 A | 9/1999 | Ference et al. |
| 5,982,103 A | 11/1999 | Mosebrook et al. |
| 6,005,759 A | 12/1999 | Hart et al. |
| 6,013,988 A | 1/2000 | Bucks et al. |
| 6,016,038 A | 1/2000 | Mueller et al. |
| 6,094,014 A | 7/2000 | Bucks et al. |
| 6,145,998 A | 11/2000 | Lynch et al. |
| 6,150,774 A | 11/2000 | Mueller et al. |
| 6,147,458 A | 12/2000 | Bucks et al. |
| 6,204,584 B1 | 3/2001 | Muszynski |
| 6,223,029 B1 | 4/2001 | Stenman et al. |
| 6,234,648 B1 | 5/2001 | Borner et al. |
| 6,250,774 B1 | 6/2001 | Begemann et al. |
| 6,252,358 B1 | 6/2001 | Xydis et al. |
| 6,264,329 B1 | 7/2001 | Brooks et al. |
| 6,275,163 B1 | 8/2001 | Bogorad et al. |
| 6,300,727 B1 | 10/2001 | Bryde et al. |
| 6,304,464 B1 | 10/2001 | Jacobs et al. |
| 6,340,864 B1 | 1/2002 | Wacyk |
| 6,388,399 B1 | 5/2002 | Eckel et al. |
| 6,513,949 B1 | 2/2003 | Marshall et al. |
| 6,528,954 B1 | 3/2003 | Lys et al. |
| 475,126 A1 | 5/2003 | Bonne |
| 6,561,690 B2 | 5/2003 | Balestriero et al. |
| 6,577,512 B2 | 6/2003 | Tripathi et al. |
| 6,580,950 B1 | 6/2003 | Johnson et al. |
| 6,586,890 B2 | 7/2003 | Min et al. |
| 6,617,795 B2 | 9/2003 | Bruning |
| 481,016 A1 | 10/2003 | Hillis |
| 6,655,817 B2 | 12/2003 | Devlin et al. |
| 6,692,136 B2 | 2/2004 | Marshall et al. |
| 6,735,619 B1 | 5/2004 | Sawada |
| 6,788,011 B2 | 9/2004 | Mueller et al. |
| 6,798,341 B1 | 9/2004 | Eckel et al. |
| 6,806,659 B1 | 10/2004 | Mueller et al. |
| 499,702 A1 | 12/2004 | Abe |
| 6,831,569 B2 | 12/2004 | Wang et al. |
| 6,844,807 B2 | 1/2005 | Inoue et al. |
| 6,922,022 B2 | 7/2005 | Johannes et al. |
| 6,930,598 B2 | 8/2005 | Weiss |
| 6,940,230 B2 | 9/2005 | Myron et al. |
| 6,950,725 B2 | 9/2005 | Von Kannewurff et al. |
| 6,963,285 B2 | 11/2005 | Fischer et al. |
| 6,967,448 B2 | 11/2005 | Morgan et al. |
| 6,969,954 B2 | 11/2005 | Lys |
| 6,972,525 B2 | 12/2005 | Johannes et al. |
| 6,975,079 B2 | 12/2005 | Lys et al. |
| 6,989,807 B2 | 1/2006 | Chiang |
| 6,990,349 B1 | 1/2006 | Pasternak |
| 6,990,394 B2 | 1/2006 | Pasternak |
| 7,030,572 B2 | 4/2006 | Bernard et al. |
| 7,038,399 B2 | 5/2006 | Lys et al. |
| 7,043,310 B2 | 5/2006 | Polz et al. |
| 7,064,498 B2 | 6/2006 | Dowling et al. |
| 7,069,345 B2 | 6/2006 | Shteyn |
| 7,072,945 B1 | 7/2006 | Nieminen et al. |
| 7,103,511 B2 | 9/2006 | Petite |
| 530,681 A1 | 10/2006 | Huang |
| 7,127,228 B2 | 10/2006 | Chang |
| 7,135,824 B2 | 11/2006 | Lys et al. |
| 7,161,311 B2 | 1/2007 | Mueller et al. |
| 7,167,777 B2 | 1/2007 | Budike, Jr. |
| 7,200,660 B2 | 4/2007 | Bruegger et al. |
| 7,202,608 B2 | 4/2007 | Robinson et al. |
| 7,204,622 B2 | 4/2007 | Dowling et al. |
| 7,218,056 B1 | 5/2007 | Harwood |
| 7,221,104 B2 | 5/2007 | Lys et al. |
| 7,231,482 B2 | 6/2007 | Leach |
| 7,233,831 B2 | 6/2007 | Blackwell |
| 7,256,554 B2 | 8/2007 | Lys |
| 7,262,559 B2 | 8/2007 | Tripathi et al. |
| 7,274,160 B2 | 9/2007 | Mueller et al. |
| 552,043 A1 | 10/2007 | Thursfield |
| 7,310,344 B1 | 12/2007 | Sue |
| 7,348,604 B2 | 3/2008 | Matheson |
| 7,352,138 B2 | 4/2008 | Lys et al. |
| 7,358,679 B2 | 4/2008 | Lys et al. |
| 7,358,681 B2 | 4/2008 | Robinson et al. |
| 7,358,706 B2 | 4/2008 | Lys |
| 7,365,282 B2 | 4/2008 | Altonen et al. |
| 7,410,271 B1 | 8/2008 | Man |
| 7,420,335 B2 | 9/2008 | Robinson et al. |
| 578,871 A1 | 10/2008 | Rogers |
| 7,437,150 B1 | 10/2008 | Morelli et al. |
| 7,464,035 B2 | 12/2008 | Funk et al. |
| 7,496,627 B2 | 2/2009 | Moorer et al. |
| 7,498,952 B2 | 3/2009 | Newman, Jr. |
| 7,504,821 B2 | 3/2009 | Shuey |
| 7,526,539 B1 | 4/2009 | Hsu |
| 7,530,113 B2 | 5/2009 | Braun |
| 7,551,071 B2 | 6/2009 | Bennett, III et al. |
| 7,566,155 B2 | 7/2009 | Schug et al. |
| 597,637 A1 | 8/2009 | Krohmer et al. |
| 7,592,925 B2 | 9/2009 | Nearhoof et al. |
| 601,976 A1 | 10/2009 | Petrillo et al. |
| 7,597,455 B2 | 10/2009 | Smith et al. |
| 7,608,807 B2 | 10/2009 | Hick et al. |
| 7,623,042 B2 | 11/2009 | Huizenga |
| 7,626,339 B2 | 12/2009 | Paton |
| 7,634,555 B1 | 12/2009 | Wainscott, Jr. et al. |
| 7,659,673 B2 | 2/2010 | Lys |
| 7,666,010 B2 | 2/2010 | Arenas et al. |
| 680,878 A1 | 3/2010 | Tsuchida et al. |
| 7,680,878 B2 | 3/2010 | Tsuchida et al. |
| 7,694,005 B2 | 4/2010 | Reckamp et al. |
| 7,702,421 B2 | 4/2010 | Sullivan et al. |
| 7,712,949 B2 | 5/2010 | Tufano et al. |
| 7,714,699 B2 | 5/2010 | Wessels |
| 7,737,643 B2 | 6/2010 | Lys |
| 7,746,877 B2 | 6/2010 | Trethewey |
| 7,747,781 B2 | 6/2010 | Maurya et al. |
| 7,781,979 B2 | 8/2010 | Lys |
| 7,800,049 B2 | 9/2010 | Bandringa et al. |
| 7,800,498 B2 | 9/2010 | Leonard et al. |
| 7,802,902 B2 | 9/2010 | Moss et al. |
| 625,294 A1 | 10/2010 | Wada |
| 7,806,558 B2 | 10/2010 | Williamson |
| 7,849,224 B2 | 12/2010 | Alrabady et al. |
| 7,860,679 B2 | 12/2010 | Rouhier et al. |
| 7,924,155 B2 | 4/2011 | Soccoli et al. |
| 7,955,096 B2 | 6/2011 | Arenas et al. |
| 7,983,795 B2 | 7/2011 | Josephson et al. |
| 8,008,802 B2 | 8/2011 | Leonard et al. |
| 8,018,166 B2 | 9/2011 | Soccoli et al. |
| 8,028,045 B2 | 9/2011 | Hofmann et al. |
| 8,047,883 B2 | 11/2011 | Montalbano et al. |
| 8,049,592 B2 | 11/2011 | Wang et al. |
| 8,050,801 B2 | 11/2011 | Richards et al. |
| 8,064,387 B2 | 11/2011 | Jiang et al. |
| 8,096,818 B2 | 1/2012 | Arenas et al. |
| 8,110,996 B2 | 2/2012 | Budike, Jr. |
| 8,115,626 B2 | 2/2012 | Hick et al. |
| 8,145,360 B2 | 3/2012 | Brundisini et al. |
| 8,159,149 B2 | 4/2012 | Mubaslat et al. |

(56) References Cited

U.S. PATENT DOCUMENTS

| | | |
|---|---|---|
| 8,209,400 B2 | 6/2012 | Baum et al. |
| 8,212,485 B2 | 7/2012 | Elek et al. |
| 8,220,958 B2 | 7/2012 | Montagne |
| 8,227,731 B2 | 7/2012 | Hick et al. |
| 8,248,203 B2 | 8/2012 | Hanwright et al. |
| 8,248,252 B2 | 8/2012 | Schechter et al. |
| 8,253,340 B2 | 8/2012 | Paton |
| 8,255,090 B2 | 8/2012 | Frader-Thompson et al. |
| 8,258,654 B2 | 9/2012 | Parsons |
| 8,278,838 B2 | 10/2012 | Shen |
| 8,281,010 B2 | 10/2012 | Ansari et al. |
| 8,295,268 B2 | 10/2012 | Tanaka et al. |
| 8,299,721 B2 | 10/2012 | Smith |
| RE43,828 E | 11/2012 | Tufano et al. |
| 8,312,347 B2 | 11/2012 | Hick et al. |
| 8,335,842 B2 | 12/2012 | Raji et al. |
| 8,371,863 B1 | 2/2013 | Ganta et al. |
| 8,463,453 B2 | 6/2013 | Parsons, Jr. |
| 685,750 A1 | 7/2013 | Nakagawa |
| 8,502,660 B2 | 8/2013 | Hick |
| 8,530,840 B2 | 9/2013 | Carberry et al. |
| 690,662 A1 | 10/2013 | Maier et al. |
| 8,602,799 B2 | 12/2013 | Ganta et al. |
| 8,613,624 B2 | 12/2013 | Arenas et al. |
| 8,638,211 B2 | 1/2014 | Cohn |
| 8,731,689 B2 | 5/2014 | Platner et al. |
| 8,796,940 B2 | 8/2014 | Altonen et al. |
| 8,893,968 B2 | 11/2014 | Jonsson |
| 9,055,624 B2 | 6/2015 | Middleton-White et al. |
| 9,099,955 B2 | 8/2015 | Ramirez |
| 9,144,139 B2 | 9/2015 | Joyce et al. |
| 9,177,467 B2 | 11/2015 | Tu |
| 9,192,019 B2 | 11/2015 | Huizenga et al. |
| 9,270,109 B2 | 2/2016 | Dolezilek et al. |
| 9,335,750 B2 | 5/2016 | Lu et al. |
| 9,396,504 B2 | 7/2016 | Donde et al. |
| 2004/0010327 A1 | 1/2004 | Terashima et al. |
| 2004/0136358 A1 | 7/2004 | Hind et al. |
| 2004/0143510 A1 | 7/2004 | Haeberle et al. |
| 2004/0263084 A1 | 12/2004 | Mor et al. |
| 2005/0007024 A1 | 1/2005 | Evans et al. |
| 2005/0007031 A1 | 1/2005 | Hyder |
| 2005/0097162 A1 | 5/2005 | Budike, Jr. |
| 2005/0108430 A1 | 5/2005 | Howarth et al. |
| 2006/0044152 A1 | 3/2006 | Wang |
| 2006/0215345 A1 | 9/2006 | Huizenga |
| 2006/0262462 A1 | 11/2006 | Barton |
| 2007/0293208 A1 | 12/2007 | Loh et al. |
| 2008/0007942 A1 | 1/2008 | Ruggles et al. |
| 2008/0042826 A1 | 2/2008 | Hevia et al. |
| 2008/0082637 A1 | 4/2008 | Krainz et al. |
| 2008/0020903 A1 | 8/2008 | Shin et al |
| 2008/0266050 A1 | 10/2008 | Crouse et al. |
| 2008/0272586 A1 | 11/2008 | Hick et al. |
| 2008/0282182 A1 | 11/2008 | Oosaka |
| 2009/0059603 A1 | 3/2009 | Recker et al. |
| 2009/0103307 A1 | 4/2009 | Shu |
| 2009/0180261 A1 | 7/2009 | Angelides et al. |
| 2009/0251314 A1 | 10/2009 | Jiang et al. |
| 2009/0261734 A1 | 10/2009 | Newman, Jr. |
| 2009/0278479 A1 | 11/2009 | Planter et al. |
| 2009/0289757 A1 | 11/2009 | Ballard |
| 2009/0309501 A1 | 12/2009 | Catalano et al. |
| 2009/0322231 A1 | 12/2009 | Lobo |
| 2010/0037071 A1 | 2/2010 | Chang |
| 2010/0038440 A1 | 2/2010 | Ersavas |
| 2010/0101924 A1 | 4/2010 | Wu et al. |
| 2010/0114334 A1 | 5/2010 | Krumsiek |
| 2010/0122338 A1 | 5/2010 | Kataoka et al. |
| 2010/0237711 A1 | 9/2010 | Parsons |
| 2010/0244709 A1 | 9/2010 | Steiner et al. |
| 2010/0259193 A1 | 10/2010 | Umezawa et al. |
| 2010/0264313 A1 | 10/2010 | Jalbout et al. |
| 2010/0265700 A1 | 10/2010 | Galluccio et al. |
| 2010/0277300 A1 | 11/2010 | Cohn et al. |
| 2010/0277302 A1 | 11/2010 | Cohn et al. |
| 2010/0277306 A1 | 11/2010 | Leinen et al. |
| 2010/0277315 A1 | 11/2010 | Cohn et al. |
| 2010/0318685 A1 | 12/2010 | Kraus et al. |
| 2010/0321929 A1 | 12/2010 | Ramirez et al. |
| 2011/0012434 A1 | 1/2011 | Lee et al. |
| 2011/0012532 A1 | 1/2011 | Barnett et al. |
| 2011/0026510 A1 | 2/2011 | Matsumura et al. |
| 2011/0090042 A1 | 4/2011 | Leonard et al. |
| 2011/0138058 A1 | 6/2011 | Ishida |
| 2011/0144820 A1 | 6/2011 | Trauer |
| 2011/0147037 A1 | 6/2011 | Tee et al. |
| 2011/0156911 A1 | 6/2011 | Caglianone |
| 2011/0175553 A1 | 7/2011 | Sampsell |
| 2011/0184577 A1 | 7/2011 | Ilyes |
| 2011/0187273 A1 | 8/2011 | Summerford et al. |
| 2011/0196755 A1 | 8/2011 | Landa |
| 2011/0210684 A1 | 9/2011 | Lanchava et al. |
| 2011/0215736 A1 | 9/2011 | Horbst et al. |
| 2011/0216546 A1 | 9/2011 | Lombardi et al. |
| 2011/0221348 A1 | 9/2011 | Kwag et al. |
| 2011/0248636 A1 | 10/2011 | Liao |
| 2011/0248643 A1 | 10/2011 | Liu et al. |
| 2011/0257766 A1 | 10/2011 | Sundaram et al. |
| 2011/0277001 A1 | 11/2011 | Kaluskar et al. |
| 2011/0278922 A1 | 11/2011 | Leonard et al. |
| 2011/0282509 A1 | 11/2011 | Yegin et al. |
| 2011/0284730 A1 | 11/2011 | Sturdevant |
| 2011/0291586 A1 | 12/2011 | Komagata et al. |
| 2011/0309769 A1 | 12/2011 | Kuroki et al. |
| 2012/0019150 A1 | 1/2012 | Yang et al. |
| 2012/0038490 A1 | 2/2012 | Verfuerth |
| 2012/0056726 A1 | 3/2012 | Paul |
| 2012/0068611 A1 | 3/2012 | Steiner et al. |
| 2012/0086560 A1 | 4/2012 | Ilyes et al. |
| 2012/0091902 A1 | 4/2012 | Radermacher |
| 2012/0096120 A1 | 4/2012 | Couillabin et al. |
| 2012/0098439 A1 | 4/2012 | Recker et al. |
| 2012/0112654 A1 | 5/2012 | Choong et al. |
| 2012/0126699 A1 | 5/2012 | Zittel |
| 2012/0136485 A1 | 5/2012 | Weber et al. |
| 2012/0151058 A1 | 6/2012 | Lee |
| 2012/0153867 A1 | 6/2012 | Van Den Biggelaar |
| 2012/0181935 A1 | 7/2012 | Velazquez |
| 2012/0187839 A1 | 7/2012 | Hammel et al. |
| 2012/0198533 A1 | 8/2012 | Thomas et al. |
| 2012/0212140 A1 | 8/2012 | Kim et al. |
| 2012/0219008 A1 | 8/2012 | Lee et al. |
| 2012/0221713 A1 | 8/2012 | Shin |
| 2012/0230698 A1 | 9/2012 | Park et al. |
| 2012/0236554 A1 | 9/2012 | Rust |
| 2012/0248312 A1 | 10/2012 | Soccoli et al. |
| 2012/0256540 A1 | 10/2012 | Batty et al. |
| 2012/0274234 A1 | 11/2012 | Campbell et al. |
| 2012/0274791 A1 | 11/2012 | Thomas et al. |
| 2012/0278640 A1 | 11/2012 | Caglianone |
| 2012/0293013 A1 | 11/2012 | Parsons |
| 2012/0296487 A1 | 11/2012 | Leinen et al. |
| 2012/0299566 A1 | 11/2012 | Hsu |
| 2012/0306621 A1 | 12/2012 | Muthu |
| 2012/0313588 A1 | 12/2012 | Carberry et al. |
| 2013/0049591 A1 | 2/2013 | Quercia et al. |
| 2013/0132787 A1 | 5/2013 | Hick et al. |
| 2013/0181617 A1 | 7/2013 | Maddox |
| 2013/0214163 A9 | 8/2013 | Soccoli et al. |
| 2013/0229132 A1 | 9/2013 | Fong |
| 2013/0253721 A1 | 9/2013 | Parsons |
| 2013/0271004 A1* | 10/2013 | Min .............. H05B 33/0842 315/112 |
| 2013/0279553 A1 | 10/2013 | Hick et al. |
| 2013/0301390 A1 | 11/2013 | Hick |
| 2013/0342687 A1 | 12/2013 | Leinen |
| 2014/0039713 A1 | 2/2014 | Hick et al. |
| 2014/0098247 A1 | 4/2014 | Rao et al. |
| 2014/0167621 A1 | 6/2014 | Trott et al. |
| 2014/0269660 A1 | 9/2014 | Dunn et al. |
| 2014/0312802 A1 | 10/2014 | Recker et al. |
| 2015/0061500 A1 | 3/2015 | Yeh |
| 2015/0085725 A1 | 3/2015 | Estevez et al. |

(56) References Cited

U.S. PATENT DOCUMENTS

| | | | |
|---|---|---|---|
| 2015/0100166 | A1 | 4/2015 | Baynes et al. |
| 2015/0177948 | A1* | 6/2015 | Sasaki .................. G08C 17/00 715/740 |
| 2016/0021723 | A1 | 1/2016 | Huizenga et al. |
| 2016/0308686 | A1 | 10/2016 | Vijayrao et al. |

FOREIGN PATENT DOCUMENTS

| | | |
|---|---|---|
| CN | 1119888 | 8/2003 |
| CN | 100414943 | 8/2008 |
| CN | 101867990 | 10/2010 |
| CN | 201655922 | 11/2010 |
| CN | 103458577 | 12/2013 |
| EM | 0890059 | 6/2004 |
| EM | 0870384 | 11/2005 |
| EM | 1371211 | 11/2005 |
| EM | 1535495 | 1/2010 |
| EM | 2474080 | 7/2012 |
| EM | 2595456 | 5/2013 |
| EM | 2725769 | 4/2014 |
| JP | 3892909 | 12/2006 |
| JP | 4141840 | 6/2008 |
| JP | 4625697 | 11/2010 |
| TW | 384583 | 3/2000 |
| WO | 03049379 | 6/2003 |
| WO | 2006040364 | 4/2006 |
| WO | 2009098074 | 8/2009 |
| WO | 2009103587 | 8/2009 |
| WO | 2010017588 | 2/2010 |
| WO | 2010039016 | 4/2010 |
| WO | 2010083629 | 7/2010 |
| WO | 2012060679 | 5/2012 |
| WO | 2012109696 | 8/2012 |
| WO | 2012145766 | 10/2012 |
| WO | 2013119030 | 8/2015 |
| WO | 2015144231 | 10/2015 |

OTHER PUBLICATIONS

"EyeNut Ingenious Control", Harvard Technology; Retrieved from http://www.harvardtechnology.com/solutions/eyenut.
"LevNet RF Self-Powered Wireless Light Sensor; Self-Powered RF Wireless Light Sensor for use with LevNet RF Receivers", Leviton, Product Data; 2010.
"Smart Choices for Scalable Automation Solutions. Total Control of Your Business from Anywhere", Leviton.
"Wiscape Wireless Street Lighting Controls", Hubbell.
Dini , et al., "Considerations on Security in ZigBee Networks", University of Pisa, Italy; Jul. 7, 2010.
Farmer , et al., "ZigBee Wikipedia", Retrieved from: https://en.wikipedia.org/wiki/ZigBee?oldid=709776015; Accessed in Mar. 2016.
Inter: Light, Inc. , "Light Guide: Occupant Sensors", Retrieved from: http://www.lightsearch.com/resources/lightguides/sensors.html on Nov. 9, 2016.
Kyaw, Zin , Metering International, World Meter Design Congress, Texas Instruments, San Diego, CA; Mar. 2010.
Lee , et al., "A Smart Energy System with Distributed Access Control", Department of Computer Science, National Tsing Hua University, Taiwan, Department of Computer Science, University of California, Irvine, USA.
Masica, Ken , "Recommended Practices Guide for Securing ZigBee Wireless Networks in Process Control System Environments", Control Systems Security Program, Apr. 2007.
Piro , et al., "A standard compliant security framework for IEEE 802.15.4 networks", Politecnico di Bari, Italy, Mar. 6, 2014.
Silicon Laboratories Inc. , "UG103.5: Application Development Fundamentals: Security", Rev. 1.0; Accessed on Apr. 20, 2016.
Smartthings, Inc. , "Security of SmartThings ecosystem", Accessed on Apr. 20, 2017.
US Dept of Energy , "Wireless Sensors for Lighting Energy Savings", Federal Energy Management Program, Mar. 2016.
Wang , et al., "Design of Smart Home System Based on WiFi Smart Plug", International Journal of Smart Home; vol. 3, No. 6; pp. 173-182; Jun. 2015.
ZigBee Alliance, Inc. , "Security and encryption-XBee ZigBee Mesh Kit;", Accessed on Jul. 29, 2016.
ZigBee Alliance, Inc. , "Security on the XBee-XBee ZigBee Mesh Kit", May 10, 2017.
ZigBee Alliance, Inc. , "ZigBee in a nutshell-XBee ZigBee Mesh Kit", Jul. 10, 2015.
ZigBee Alliance, Inc. , "ZigBee Over-the-Air Upgrading Cluster", Revision 18, Version 1.0, San Ramon, CA, Mar. 14, 2010.
ZigBee Alliance, Inc. , "ZigBee Security Model-XBee ZigBee Mesh Kit"; May 10, 2017.
ZigBee Alliance, Inc. , "ZigBee Smart Energy Standard", Revision 19, Version 1.2a, Dec. 3, 2014.
Zillner, Tobias , "ZigBee Exploited the good, the bad and the ugly", Version 1.0, Vienna, Austria, Aug. 6, 2015.

\* cited by examiner

DEVICE INDICATION AND COMMISSIONING FOR A LIGHTING CONTROL SYSTEM

RELATION TO OTHER PATENT APPLICATION

This application claims priority to provisional patent application 62/035,558, filed Aug. 11, 2014, and having the same title.

TECHNICAL FIELD

The present disclosure relates generally to wireless device control systems, and more particularly to wireless control systems for remotely and automatically controlling electrical devices.

BACKGROUND

Various systems are known for remotely controlling or automating operation of electrical devices. For example, home, or building, automation systems may facilitate automated control of various devices, such as lighting, appliances, and security features. That is, various devices may be configured to operate according to predetermined schedules or events, such as in response to time or user preferences. Remote monitoring or control of certain devices is also offered, including the monitoring or controlling of devices over a network using a mobile device. As the automation and control, including remote control, of devices becomes more popular and as the desired control becomes more complex, there is a need for robust device control systems that are relatively straightforward to install, configure, and use. Although some relatively sophisticated systems are available, they typically require extensive wiring and are expensive to install and maintain.

The present disclosure is directed to one or more of the problems or issues set forth above.

SUMMARY OF THE DISCLOSURE

In one aspect, a wireless device control system includes a remote server connected to a wide area network and having control software for configuring, monitoring, and controlling devices at a site. The wireless device control system also includes a wireless gateway located at the site and configured to communicate with the remote server via cellular communication. Control devices are in wireless communication with the wireless gateway via a mesh network, with each of the control devices being wired to control one of the site devices. A computer device is connected to the wide area network and has an interface enabling a user to access the server control software. Control instructions entered on the remote server through the interface are communicated from the remote server to the wireless gateway and then from the wireless gateway to the control devices.

In another aspect, a deployment kit for planning an installation of a site system of a wireless device control system includes a set of deploy modules. The set of deploy modules includes a gateway simulator with a radio transceiver configured as a coordinator. The set of deploy modules also includes a plurality of device simulators simulating devices having control modules. Each of the device simulators includes a radio transceiver configured as a router and each of the device simulators is configured without a control module. Each of the device simulators also includes an indicator having a first state corresponding to a successful radio communication connection with the gateway simulator and at least a second state corresponding to an unsuccessful radio communication connection with the gateway simulator.

In another aspect, a method of configuring a wireless device control system is provided. The wireless device control system includes a server system, a site system, and a plurality of user devices. The method includes steps of displaying representations of devices of the site system on a user interface of one of the user devices, and detecting actuation of a device identification feature on a selected device of the site system by a gateway of the site system. The method also includes communicating an indication of the actuation and a unique device identifier of the selected device from the gateway to the server system, and changing a representation corresponding to the selected device on the user interface responsive to receipt of the indication of the actuation and the unique device identifier by the server system.

In yet another aspect, a wireless device control system includes a server system, a site system, and a plurality of user devices. The system also includes a user interface of one of the user devices configured to display representations of devices of the site system. A gateway of the site system is configured to detect actuation of a device identification feature on a selected device of the site system, wherein the selected device has a unique device identifier. The gateway is further configured to communicate an indication of the actuation and the unique device identifier to the server system. The server system is configured to change a representation corresponding to the selected device on the user interface responsive to receipt of the indication of the actuation and the unique device identifier.

DETAILED DESCRIPTION

Figure 1:
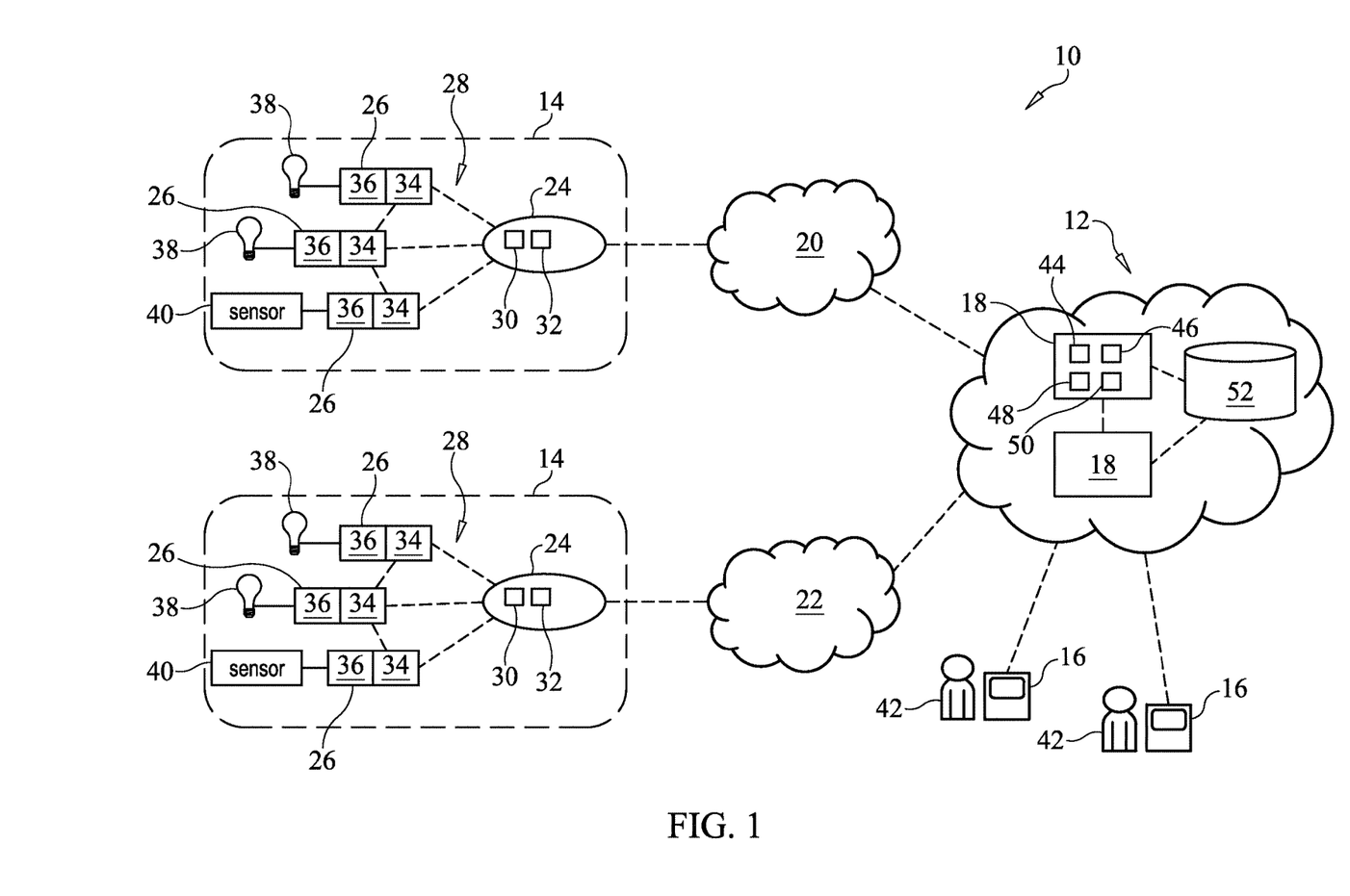
FIG. 1 is an exemplary wireless device control system, according to the present disclosure.

FIG. 1 illustrates an exemplary wireless device control system 10, according to the present disclosure. Although a wireless lighting control system will be described, it should be appreciated that the systems and methods described herein are applicable to the automation, monitoring, and/or control of a variety of devices or components in a variety of environments. The exemplary system 10 generally includes a server, or backend, system 12, one or more site systems 14, and various user devices 16. Exemplary site systems 14 may include all or portions of a home, business, parking garage, street, worksite, or other location that includes a predefined set of components, such as electrical devices or circuits, for example, light fixtures, to be monitored or controlled.

The server system 12 may include one or more servers, or computers, 18 including typical computer components, such as a processor, memory, storage, display, network interface, and input/output device, for example. The processor, or processors, may execute unique sets of instructions, which may be implemented as computer readable program code, stored in memory or storage, such that the server system 12 is configured as a special purpose system. In particular, hardware, software, and particular sets of instructions may transform the server system 12, or portions thereof, into a lighting control server system, as described herein. As should be appreciated by those skilled in the art, the server system 12 may also include any combination of computer hardware and software that facilitates communication with the site systems 14 and user devices 16, and performance of the functions described herein.

According to a specific implementation, all or portions of the server system 12 may be cloud-based. That is, for example, the one or more servers 18 of the server system 12 may reside on the Internet, for example, rather than on a local computer. To be clear, the server system 12 may be remote from the site systems 14 and/or the user devices 16. For example, Device Cloud, offered by Etherios, Inc., is a public cloud platform for device network management that may be used for all or portions of the server system 12. The server system 12 may communicate with the site systems 14 and the user devices 16 over a wide area network (WAN), such as the Internet 20, via a local area network (LAN), and/or via a cellular network 22, for example.

Each site system 14 may generally include at least a gateway, or base station, 24, and one or more devices 26, or device nodes, which are configured to communicate over a mesh network 28, or other similar local wireless network. The gateway 24 may include a communications module 30 that facilitates communication between the mesh network 28, or other wireless network, and the WAN network 20 or 22. As such, the gateway 24 may facilitate communication between the devices 26 of the site system 14 and the server system 12. The gateway 24 may also include an operations module 32 for processing and/or communicating instructions received from the server system 12, as will be described in greater detail below. The operations module 32 may also receive and/or process information from the devices 26. That is, the gateway 24 may run applications locally while also interfacing across the mesh network 28 for WAN connectivity to the server system 12.

According to a specific example, the gateway 24 may communicate with the server system 12 via cellular or, more particularly, machine-to-machine cellular. As such, the gateway 24 may be provided with a subscriber identity module (SIM) card for facilitating communication over a cellular network. This connection may be maintained while the gateway 24 is powered on, and, by avoiding the use of an Ethernet or WiFi connection, may be more secure than alternative communications means.

Each device 26 may include a communications module 34, facilitating communication between the device 26 and the gateway 24 over a local wireless network, such as the mesh network 28. For example, the devices 26 may each include a radio transceiver, such as an XBee radio module for communicating using the ZigBee protocol, which is related to IEEE standards, including 802.15.4. The devices 26 may also include at least one type of control module 36 for facilitating interaction between the device 26 and an associated electrical component.

For example, some control modules 36 may be configured to control operations of devices, such as lights 38, while other of the control modules 36 may be configured to detect the state of particular devices or components, such as sensors 40. In particular, one control module 36 used in a switch device or dimmer device may function as a remotely controllable relay switching and/or dimming a light 38, while another control module 36 used in a trigger device, occupancy sensor device, or daylight harvester device may function as a remote device that senses a condition or the state of an associated device, such as a sensor 40, and conveys the information to the gateway 24 and, ultimately, the server system 12. For example, a trigger device 26 can be configured to detect voltage or current to determine the state of a device, such as a room light switch or a light fixture having its own motion or other sensor to activate it. The control modules 36 may be configured to permit the respective devices 26 to function as various other devices, including remote dimmers, to perform functions desirable in a lighting control system, for example. Some devices 26 may also be configured to act as a repeater, or router, such that it can also forward messages to other devices 26.

Each of the user devices 16 may include a computer device, such as, for example, a personal computer, laptop computer, netbook computer, mobile device, portable electronic device (PED), or cell phone, configured to communicate with the server system 12, or possibly the gateway 24, to permit a user 42 to remotely configure, monitor, and/or control electrical components for a particular site system 14. That is, a user 42 may access a control program, or control logic, on the server system 12 through an appropriate interface using user device 16, which may have web-browsing abilities or may have a control application installed thereon. For example, upon requesting a Uniform Resource Locator (URL) address corresponding to a website hosted by the server system 12, a web page may be loaded in a web browser of one of the client devices 16. That is, one of the servers 18 may be or may include a web server for delivering web content to the user 42 through one of the user devices 16 described above. Thereafter, the user 42 may be provided with an option of registering for or accessing an account.

The system 10 or, more specifically, the server system 12 may include a plurality of modules useful in carrying out the control strategies disclosed herein. For example, the server system 12 may include or utilize functionality expressed with reference to an account registration module 44, a user manager module 46, a device manager module 48, and a communications module 50, to name a few. It should be appreciated that the term "modules," as used herein, is for ease of explanation, rather than limitation, and is intended to represent certain related aspects or functionality of the wireless device control system 10. Each of the modules may represent a set of computer instructions, or computer readable program code, representing processes for performing specific tasks of the wireless device control system 10. The tasks may be performed using a processor, or processors, and may require the access or manipulation of data stored in a data repository 52.

The account registration module 44, which will be discussed in greater detail below, may facilitate the creation of accounts and/or users, such as users 42, within the system 10. For example, the registration module 44 may be used to collect data input by users 42 and/or administrators accessing the wireless device control system 10 through one of various user devices 16. According to some embodiments, the various user devices 16 may include any suitable electronic communication devices and/or workstations, such as, for example, personal computers, laptop computers, netbook computers, mobile devices, PEDs, and cell phones, as mentioned above. The account registration module 44 may be used to collect various information, including, for example, personally identifiable information, such as, for example, name, address, and phone number.

The user manager module 46 may include and/or implement rules pertaining to the various users 42, or user types, of the system 10. For example, when one of the users 42 is registered, a user profile including user credentials, such as a username and password, may be created for the user 42 and stored in the data repository 52. The user manager module 46 may be configured to ensure that each user 42, as identified using the unique credentials, is provided with appropriate access and/or capabilities with regard to the system 10, as will be discussed in greater detail below. For example, the user manager module 46 may include an association of each user 42 to one or more sites, and may define appropriate permissions for each user 42 relative to respective site systems 14.

The wireless device control system 10 or, more specifically, the server system 12 may include a database management system including one or more databases, such as data repository 52. The data repository 52 may store data, including the account and user data described above, useful in carrying out the strategies disclosed herein. Although the data repository 52 is illustrated as a component within the server system 12, it should be appreciated that the server system 12 may include any number of separate components or systems, including separate database(s), configured to communicate with one another in a manner consistent with the teachings disclosed herein.

The device manager module 48 may provide the main functionality of the server system 12. For example, after account registration is completed and appropriate users are established in the system 10, the device manager module 48 may be programmed and/or configured to permit users 42 to remotely manage specific associated site systems 14. The device manager module 48 may also monitor and process data from the data repository 52, and/or acquired data, to facilitate configuration, monitoring, and control of the site systems 14, as will be described below. According to a specific example, the device manager module 48 may receive control information from users 42 via user devices 16, store the information in the data repository 52, and mirror the information to the appropriate gateway 24 for implementation. According to some embodiments, the data repository 52 may be initially populated with at least some default control data.

Figure 2:
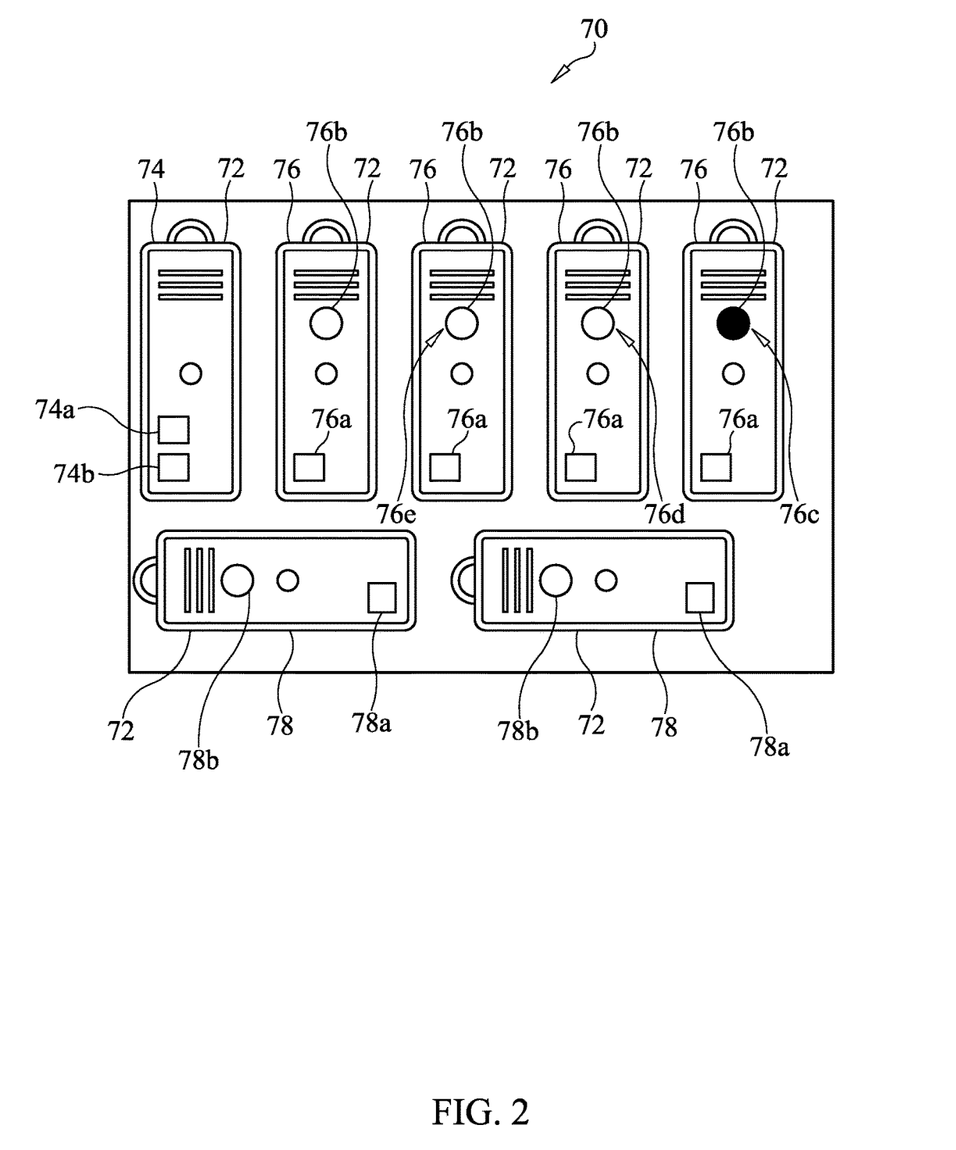
FIG. 2 is an exemplary deployment kit that may be used to plan an installation of a site system of the exemplary wireless device control system of FIG. 1, according to an aspect of the present disclosure.

As an initial step in the implementation of the wireless device control system 10 at a site, a deployment kit 70, an exemplary embodiment of which is shown in FIG. 2, may be used to plan an installation of a site system, such as one of the site systems 14 of FIG. 1. The deployment kit 70, the use of which will be discussed below with reference to FIG. 3, may generally include a set of deploy modules 72. The deploy modules 72 may be similar to one another in general construction and appearance, but some of the deploy modules 72 may differ in configuration and may have additional or alternative features. According to the exemplary embodiment, one of the deploy modules 72 may be configured to simulate certain functionality of the gateway 24 and, as such, may be referenced as a gateway simulator 74. Additionally, a number of the deploy modules 72 may be configured to simulate certain functionality of the devices 26 and, as such, may be referenced as device simulators 76. The deployment kit 70 may also include a number of repeaters 78.

The gateway simulator 74 may incorporate only portions, and not all, of the functionality of a later installed gateway that will ultimately be utilized at the site, such as the gateways 24 described above. That is, while the gateways 24 described above include a communications module 30 and an operations module 32, the gateway simulator 74 may only include a communication component 74a, and may not include additional components required for implementing the site system 14. The communication component 74a may be a radio transceiver or transmitter, such as an XBee radio module for communicating using the ZigBee protocol, for communicating with the device simulators 76. In particular, the radio component 74a may be configured as a coordinator, as is known by those skilled in the area of mesh networking. Although not required, the gateway simulator 74, according to some embodiments, may include an additional communication component 74b for evaluating communication capabilities with regard to an additional network, such as, for example, a cellular network.

The device simulators 76 may incorporate only portions, and not all, of the functionality of later installed devices, such as devices 26 above. That is, while the devices 26 are described above as including a communications module 34 and a control module 36, the device simulators 76 may only include a communication component 76a. The communication component 76a may be a radio transceiver or receiver, such as an XBee radio module for communicating using the ZigBee protocol, for communicating with the gateway simulator 74. In particular, the radio transceiver 76a may be configured as a router, as is known by those skilled in the area of mesh networking. The device simulators 76 do not include some of the additional components and features, such as a control module 36, required for implementing the site system 14. That is, the device simulators 76 may each be configured without the control module 36.

Although some of the deploy modules 72, such as the gateway simulator 74 and the device simulators 76, cannot later be used at the site system 14, the deployment kit 70 is useful for successfully planning a site deployment. In particular, the deploy modules 72 may be used to determine suitable locations for the gateway 24 and devices 26 prior to installation. According to the exemplary embodiment, the device simulators 76 may include indicators 76b configured to provide an indication of whether or not the device simulators 76 can communicate with the gateway simulator 74, either directly or indirectly, using the respective communication components 74b and 76b.

For example, each indicator 76b may be a light, such as one or more LED lights, that illuminate, or illuminate a predetermined color or pattern, reflecting successful communication of the device simulator 76 with the gateway simulator 74. The indicator 76b may illuminate a different predetermined color or pattern, or may not illuminate at all, to reflect unsuccessful communication of the device simulator 76 with the gateway simulator 74. That is, the indicators 76b may have a first state, such as an illuminated or first color or pattern state exemplified at 76c (e.g., illuminated state), reflecting a successful radio communication connection with the gateway simulator 74 and a second state, such as a non-illuminated or second color or pattern state 76d (e.g., non-illuminated state), reflecting an unsuccessful radio communication connection with the gateway simulator 74, for example, the device is on, but no radio communication with the gateway simulator 74 is established, or the radio communication signal strength is below a preset desired threshold. Additionally or alternatively, a third state, such as a non-illumination or a third color or pattern state 76e can indicate the device simulator 76 is in an off or non-testing state.

The deployment kit 70 may also include repeaters 78, which each include a communication component 78a. The communication component 78a may be a radio transceiver, such as an XBee radio module for communicating using the ZigBee protocol, for communicating with the gateway simulator 74 and/or device simulators 76. These repeaters 78 may function only to relay communication signals and to act as intermediaries between device simulators 76 and the gateway simulator 74, thus improving the communication and range of the wireless mesh network 28. The repeaters 78 may also include indicators 78b configured to provide an indication of whether or not the repeaters 78 can communicate with the gateway simulator 74, either directly or indirectly, using the respective communication components 74b and 78b. The device simulators 76 and the repeaters 78 may be similar, or identical, in that all of these deploy modules 72 may be configured as ZigBee routers, for example, and may include indication states as discussed above for device simulators 76. Since later implemented routers would not require additional components or features, the repeaters 78 provided in the deployment kit 70 may ultimately be integrated into the site system 14.

Figure 3:
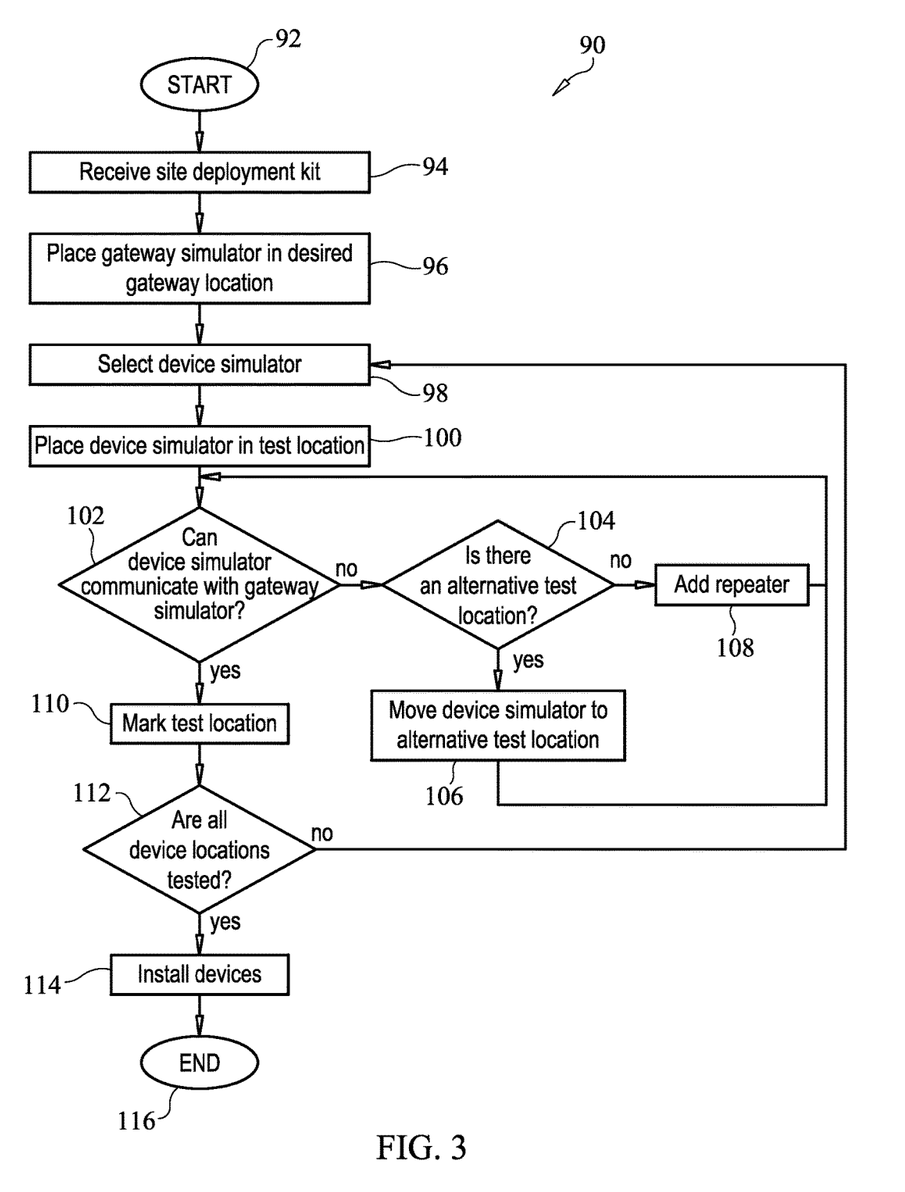
FIG. 3 is a flowchart illustrating an exemplary method for planning a site system installation using the deployment kit of FIG. 2.

The deployment kit 70 will be discussed in greater detail with reference to a flowchart 90 shown in FIG. 3, with continued reference to FIGS. 1 and 2. The flowchart 90 illustrates an exemplary method for planning a site system installation using the deployment kit 70. The method begins at a START, step 92, and proceeds to step 94, in which the deployment kit 70 is received by a user, such as user 42. Although the user 42 may be an end user of the site system 14, it is also foreseeable that an electrician or other user that ultimately performs the site system installation will perform this planning step. That is, the deployment kit 70, and planning method, allows electricians or users 42 to perform a site survey and gauge network performance prior to installing actual control modules.

At the beginning of the planning process, and as shown at step 96, the user 42 positions the gateway simulator 74 from the deployment kit 70 at a desired gateway location. The gateway simulator 74 may be powered on and, according to embodiments including the additional communication component 74b, the gateway simulator 74 may also include an interface or display providing an indication of whether or not a network signal, such as a cellular network signal, is being received and an indication as to the strength of the signal. That is, the gateway simulator 74 may be positioned in a location at which the Internet 20 or cellular network 22 may be accessed or utilized. Once the gateway simulator 74 is properly positioned, locations for the various device simulators 76 may be tested.

Proceeding to step 98, a device simulator 76 is selected from the deployment kit 70, and is positioned in a test location (step 100). The device simulator 76, once powered on, may be configured to continually, or according to another desired frequency, try to locate the gateway simulator 74, and other deploy modules 72, and may include an interface or indicator capable of reflecting whether or not the device simulator 76 is within a suitable range for communication with the gateway simulator 74. That is, the indicator 76b may have a first state, such as an illuminated or first color or pattern state 76c, reflecting a successful radio communication connection with the gateway simulator 74 and a second state, such as a non-illuminated or second color or pattern state 76d, reflecting an unsuccessful radio communication connection with the gateway simulator 74, for example, the device is on, but no radio communication with the gateway simulator 74 is established, or the radio communication signal strength is below a preset desired threshold. Additionally or alternatively, a third state, such as non-illumination or a third color or pattern state 76e, can indicate the device simulator 76 is in an off or non-testing state.

At step 102, the method determines whether the device simulator 76 can communicate with the gateway simulator 74. If the device simulator 76 cannot communicate with the gateway simulator 74 the method proceeds to step 104, where it is determined whether or not an alternative test location exists for the device simulator 76. If an alternative test location exists, the user 42, or other user, moves the device simulator 76 to the alternative test location (step 106), and the communication test, or evaluation, is repeated. Otherwise, if an alternative test location does not exist for the device simulator 76, a repeater 78 may be added, and positioned, for relaying communication signals between the device simulator 76 and the gateway simulator 74 (step 108). The steps 102, 104, 106 and/or 108 may be repeated until the device simulator 76 is moved to a suitable location or a sufficient number of repeaters 78 have been added.

After an appropriate location for the device simulator 76 is selected, the selected test location should be marked by the user, at step 110. If any repeaters 78 are utilized, their respective locations should also be marked. Unless and until all of the prospective device locations have been tested, as queried at step 112, the user 42 continues to test the device locations using the planning method disclosed herein. After all of the appropriate equipment locations are marked, devices 26 having control modules 36 may be installed at the marked locations, at step 114. Thereafter, the method proceeds to an END, at step 116.

Figure 4:
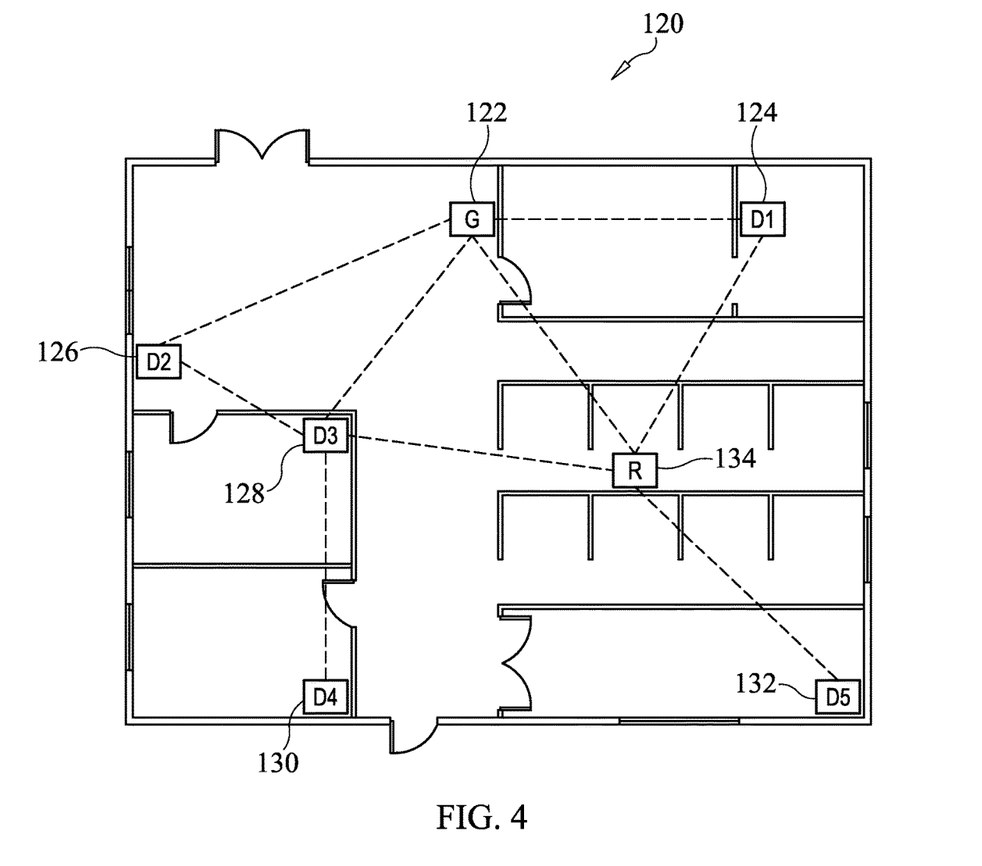
FIG. 4 is a floor plan depicting various device test locations that may be tested using the deployment kit of FIG. 2 and the method of FIG. 3.

According to a specific example, and with additional reference to FIG. 4, an exemplary, and simplified, site planning procedure is illustrated with respect to an exemplary site 120. Referring also to the method of FIG. 3 and the deployment kit 70 of FIG. 2, a gateway simulator 122, similar to gateway simulator 74, may be first positioned at a desired gateway location, as shown. Next, a first device simulator 124, similar to one of the device simulators 76, is positioned at a test location, as shown, and it is determined whether or not the device simulator 124 can communicate with the gateway simulator 122. If it is determined that the device simulator 124 is within an acceptable communication range, the user 42 may mark the test location for later installation of an actual device, such as one of devices 26 shown in FIG. 1. Similar steps may be performed with respect to second and third device simulators 126 and 128, which may also be similar to device simulators 76.

Fourth device simulator 130, similar to one of the device simulators 76, may be positioned at a test location, as shown, and although the fourth device simulator 130 cannot communicate directly with the gateway simulator 122, the fourth device simulator 130 may be able to communicate indirectly with the gateway simulator 122 through, or using, the third device simulator 128. As such, the test location for the fourth device simulator 130 may be marked for later reference. It should be appreciated, as consistent with the teachings herein, that if one or more alternative test locations exist for the fourth device simulator 130, the fourth device simulator 130 could be moved to an alternative test location and the communication capabilities could be evaluated at the alternative test location, according to the disclosed method.

A fifth device simulator 132, similar to device simulators 76, may be positioned such that it is out of range of the gateway simulator 122 and none of the other device simulators 124, 126, 128, and 130 provide an indirect communication path with the gateway simulator 122. As such, a repeater 134, similar to the repeaters 78, may be positioned within the communication path to facilitate communication between the fifth device simulator 132 and the gateway simulator 122. All of the tested locations that prove to be suitable locations should be marked for later installation of the site system components. After the site planning procedure is completed, the site system components can be installed with reasonable certainty that the device locations are appropriate. After installation, the site system components can be commissioned and/or configured.

Figure 5:
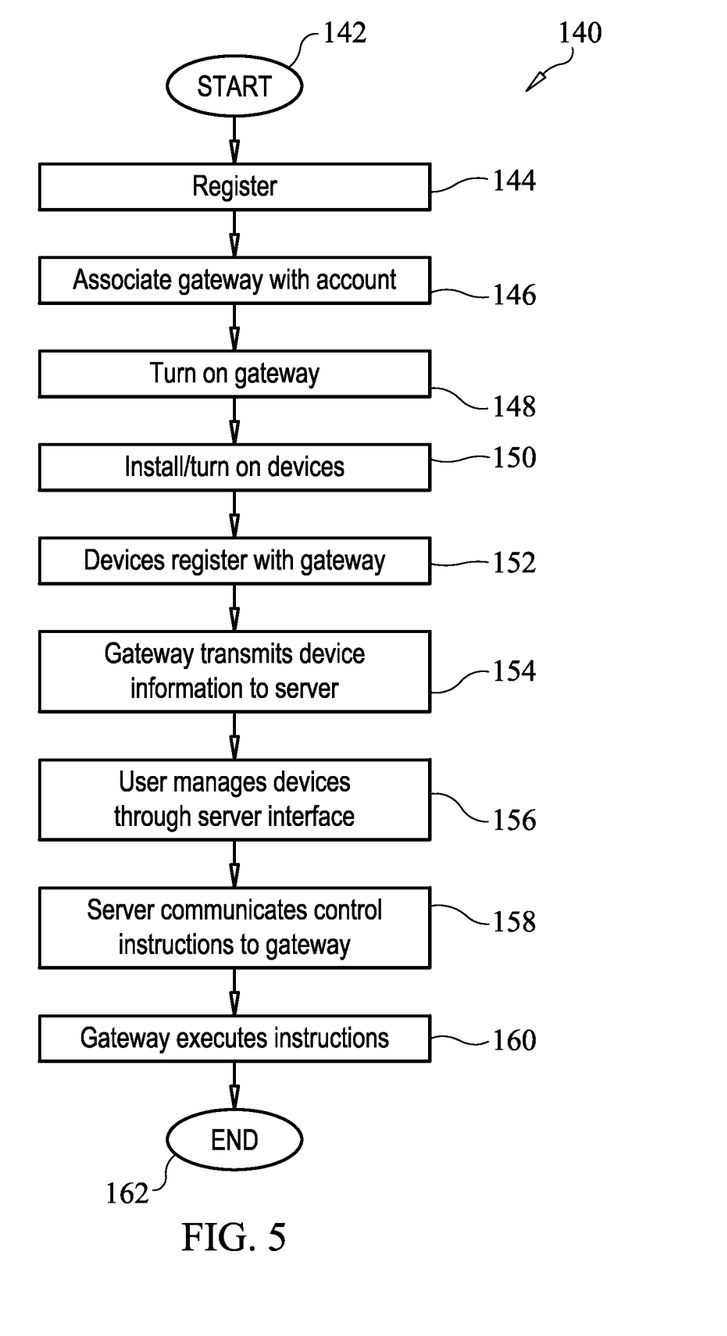
FIG. 5 is a flowchart illustrating an exemplary method for configuring the exemplary wireless device control system.

A flowchart 140 representing an exemplary method of commissioning and/or configuring a site system, such as site systems 14, is shown in FIG. 5. The method begins at a START, step 142, and proceeds to a first step, shown at step 144, in which registration occurs. In particular, a user, such as one of users 42, may access the server system 12 using an appropriate interface, such as a web-based or native application, to register and/or create a user account. Alternatively, an administrator may register users 42 and create user accounts. After registration, a gateway, such as gateway 24, may be associated with a user account, at step 146. This may be accomplished by entering a unique gateway identification number through the application, or other appropriate interface, or the gateway 24 may be pre-configured with an association to an existing account.

With the association in place, when the gateway 24 is powered on, at step 148, the gateway 24 may appear on a user interface of the user device, such as one of the user devices 16. The devices 26 may be designed such that they automatically attempt to register with the gateway 24 after they are powered on, at steps 150 and 152. That is, when the devices 26 are powered on, they wirelessly and automatically attempt to communicate with the gateway 24. In particular, the devices 26 identify themselves to the gateway 24 and the gateway 24 informs the server system 12 of the devices 26, at step 154.

The user 42 may then be able to manage devices 16 through the user interface, at step 156, as will be exemplified below. As described above, users 42 may have various levels of access and control with regard to a particular site and/or particular devices 26. After configuration, the server system 12 communicates control instructions to the gateway 24, at step 158, and the gateway 24 may execute the instructions, at step 160. Updates provided by the user 42 may be forwarded from the server system 12 to the gateway 24. In addition, the gateway 24 may receive various information from the devices 26, and may send, or relay, various updates to the server system 12. Ultimately, the method proceeds to an END, at step 162.

Figure 6:
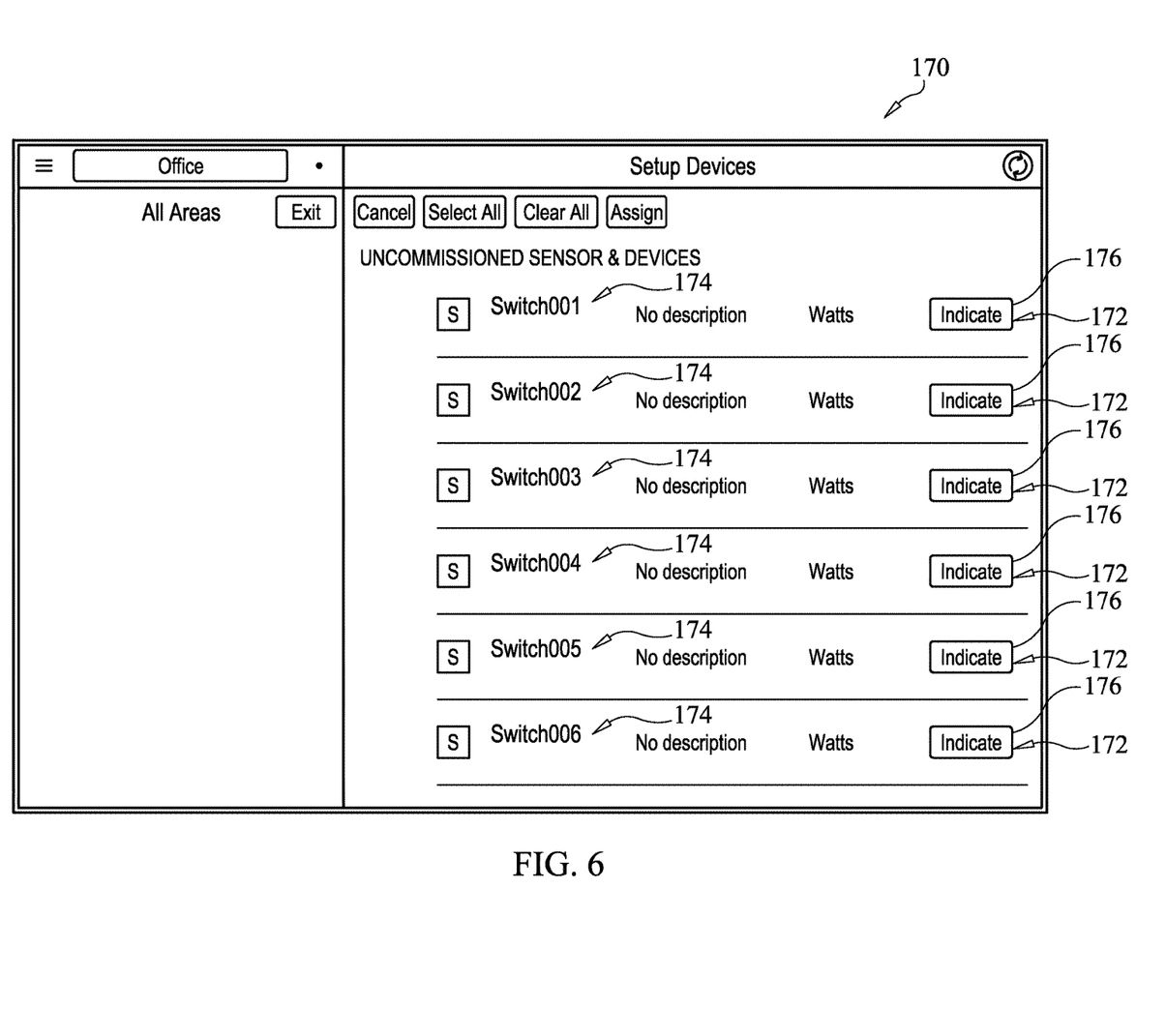
FIG. 6 is an exemplary user interface for commissioning devices of a site system.

After the devices 26 communicate with the gateway 24 and the gateway 24 communicates information about the devices 26 to the server system 12, the devices 26 may be managed within a user interface. That is, with continued reference to FIG. 1 and additional reference to FIG. 6, representations, such as, for example, graphical and/or textual representations, of the devices 26 may be displayed on a user interface 170 of one of the user devices 16. In particular, when a user 42 logs into their account, all sites, or site systems 14, associated with the user 42 may be visible through the user interface 170. When the user 42 selects one of the sites, or site systems 14, entries 172 representative of actual devices 26 are visible through the user interface 170 and include information, such as unique device identifiers 174. The user 42 may enter additional information about each device 26, such as a device location, description, and zone, using the user interface 170. To ascertain which entry 172 in the user interface 170 represents which physical device 26, a user input, such as a selection button, 176 associated with a specific one of the entries 172 displayed on the user interface 170 may be actuated. As a result, an indicator on the physical device 26 represented by that entry 172 may be modified in some predetermined way to assist the user 42 in matching each entry 172 to the physical device 26 it represents. For example, an indicator may illuminate using a predetermined duration and/or pattern.

Figure 7:
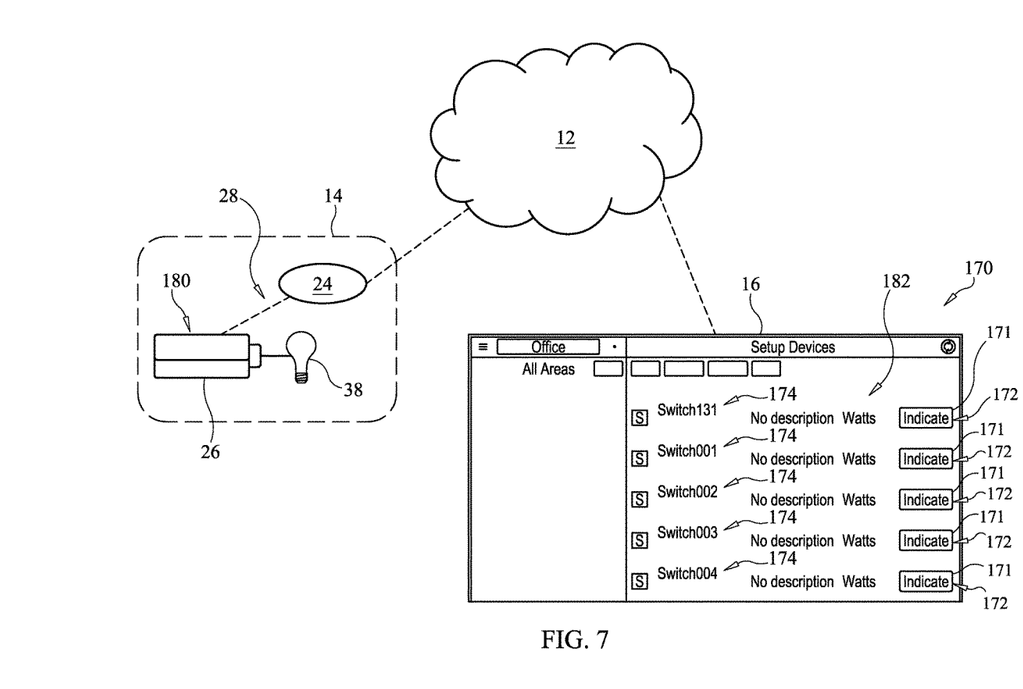
FIG. 7 is a diagram illustrating an exemplary device identification procedure that may be used during device commissioning, according to another aspect of the present disclosure.

An alternative device identification procedure is illustrated in FIG. 7. According to the alternative, or reverse, device identification procedure, the user 42 may actuate a device identification feature 180 of one of the devices 26, for example, a momentary switch. This actuation may generate a communication sent by communication module 76a and be received by the gateway 24 of the site system 14 and communicated, along with the unique device identifier 174 of the selected device 26, to the server system 12. In addition, this actuation my change a state of an indicator on the device 26, for example, one or more LEDs that blink for a period of time or other condition satisfied subsequent to the device identification feature 180 being activated. In response, the device entries 172, or other representation, in the user interface 170 may be changed to identify which device entry 172 corresponds to the selected device 26. For example, the particular device entry 182 corresponding to the selected device 26 may be moved up to the top of the list and may be pre-selected in preparation for the user 42 to continue the commissioning process. As such, the user 42 may be assisted in adding useful and accurate information about the device 26 via the user interface 170.

Once the site system 14 is planned and deployed, and the devices 26 are properly commissioned, the user 42 may begin remotely managing and controlling the devices 26 by initiating manual actions through the user interface 170 or creating behaviors and schedules to be carried out by the server system 12 and gateway 24 through the user interface 170. The system 10 can include a communication protocol for communicating between the gateway 24 and the devices 26. For example, a standard protocol packet may include a prefix identifying packets sent to or received from devices 26, a variable packet length, a device code identifying the target or origin device, a command and/or response code, and arguments associated with the command or response code. Specialized packets may include a discovery packet that queries a device 26 to identify itself and certain key attributes, a diagnostic packet that queries a device 26 to report certain usual information about itself in the course of its operation, and request state packet to poll the state of a device 26, and a transition completion packet, for example, to report completion of a brightness setting using a transition time and/or curve to a dimming device 26.

The wireless device control system 10 described herein provides sophisticated control of electrical devices, such as those utilized in lighting systems, without requiring significant processing power, electrical power, and infrastructure to work well. The systems and methods disclosed herein assist in installing, configuring, and using the system 10.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A method of configuring a wireless device control system, wherein the wireless device control system includes a server system, a site system, and a plurality of user devices, the method comprising steps of:
   displaying representations of devices of the site system on a user interface of one of the user devices;
   actuating a device identification feature on a selected device of the site system;
   detecting actuation of a device identification feature by a gateway of the site system, wherein the selected device has a unique device identifier;
   communicating an indication of the actuation and the unique device identifier from the gateway to the server system; and
   changing a representation corresponding to the selected device on the user interface responsive to receipt of the indication of the actuation and the unique device identifier by the server system.

2. The method of claim 1, wherein the devices are control devices in wireless communication with the gateway via a mesh network.

3. The method of claim 2, wherein the control devices are wired to control lighting devices at the site system.

4. A wireless device control system, wherein the wireless device control system includes a server system, a site system, and a plurality of user devices, the system comprising:
   a user interface of one of the user devices configured to display representations of devices of the site system; and
   a gateway of the site system configured to detect actuation of a device identification feature on a selected device of the site system, wherein the selected device has a unique device identifier;
   wherein the gateway is further configured to communicate an indication of the actuation and the unique device identifier to the server system;
   wherein the server system is configured to change a representation corresponding to the selected device on the user interface responsive to receipt of the indication of the actuation and the unique device identifier.

5. The wireless device control system of claim 4, wherein the devices are control devices in wireless communication with the gateway via a mesh network.

6. The wireless device control system of claim 4, wherein the control devices are wired to control lighting devices at the site system.

7. The wireless device control system of claim 6, wherein the user interface is further configured to allow entry of additional display information for the selected device upon receipt of the indication, the additional information relating to the lighting device controlled by the selected device.

8. The wireless device control system of claim 4, wherein the server system is remote from the site system and at least one of the plurality of user devices communicates with the server system.

9. The wireless device control system of claim 8, wherein the gateway and server system communicate via a cellular network.

10. The wireless device control system of claim 5, wherein the devices include wireless transceivers forming the mesh network.

11. The wireless device control system of claim 4, wherein the device identification feature comprises a switch.

12. The wireless device control system of claim 4, further comprising:
   a user account stored on the server system, associated with the gateway, and accessible by at least one of the plurality of user devices; and
   wherein the selected device is further configured to register with the gateway upon a user powering the selected device; and
   wherein the gateway is further configured to communicate the device registration from the gateway to the server system user account.

13. The wireless device control system of claim 4, wherein:
   the user interface is configured to allow a user to activate identification of the selected device at the site system;
   the server system communicates the activation of identification to the gateway;
   the gateway communicates the activation of identification to the selected device; and
   the selected device is configured to modify a state of the device upon receiving the activation of identification from the gateway.

14. The wireless device control system of claim 13, wherein:
   the devices include an indicator; and
   the modification of the state of the device is a change in an illumination state of the indicator.

15. The method of claim 3, further comprising the step of entering via the user interface additional display information for the selected device, the additional information relating to the lighting device controlled by the selected device.

16. The method of claim 1, further comprising the steps of:
   associating the gateway with a user account stored on the server system and accessible by at least one of the plurality of user devices;
   powering on the selected device and registering the selected device with the gateway; and
   communicating the device registration from the gateway to the server system user account.

17. The method of claim 16, wherein the steps of communicating from the gateway to the server system is provided by a cellular network.

18. The method of claim 1, further comprising the steps of:
   selecting a displayed representation of a device on the user interface to activate identification of the selected device at the site system;
   communicating the selection and activation of the identification of the selected device from the server system to the gateway and from the gateway to the selected device; and
   modifying a state of the selected device to identify the selected device to a user.

* * * * *

UNITED STATES PATENT AND TRADEMARK OFFICE
CERTIFICATE OF CORRECTION

PATENT NO. : 9,883,567 B2  
APPLICATION NO. : 14/823560  
DATED : January 30, 2018  
INVENTOR(S) : Ross A. Barna and Michael Theodore Case-Hayes It is certified that error appears in the above-identified patent and that said Letters Patent is hereby corrected as shown below:

On the Title Page

Item [73], Assignee, "Nrothvale", should read -- Northvale --.

Signed and Sealed this  
Third Day of April, 2018

Andrei Iancu  
*Director of the United States Patent and Trademark Office*